United States Patent [19]
Schroeder

[11] Patent Number: 5,942,305
[45] Date of Patent: Aug. 24, 1999

[54] FIRE RETARDANT WALL PADDING

[75] Inventor: Edward Schroeder, Marengo, Ill.

[73] Assignee: Porter Athletic Equipment Company, Broadview, Ill.

[21] Appl. No.: 08/934,906

[22] Filed: Sep. 22, 1997

[51] Int. Cl.⁶ ..................................................... B32B 3/02
[52] U.S. Cl. .................................. 428/68; 5/671; 5/682; 5/709; 428/71; 428/76; 428/95; 428/106; 428/319.7
[58] Field of Search ................................. 428/68, 71, 76, 428/95, 319.7, 106; 5/671, 682, 709

[56] References Cited

U.S. PATENT DOCUMENTS 3,872,525  3/1975  Lea ................................................ 5/571
5,009,333  4/1991  Souders ...................................... 211/13

Primary Examiner—Nasser Ahmad
Attorney, Agent, or Firm—Barnes & Thornburg

[57] ABSTRACT

A wall padding having a core of open cell, low smoke, flame resistant polychloroprene and a cover of fire retardant vinyl on the core. The total padding having a flame spread index in the range of 0 to 25 and a smoke development index in the range of 0 to 450.

6 Claims, 1 Drawing Sheet

FIRE RETARDANT WALL PADDING

BACKGROUND AND SUMMARY OF THE INVENTION

The present invention relates generally to wall padding and more specifically to wall padding which is fire retardant.

Wall padding, for example, in gymnasiums or other athletic areas are well known. They typically include a core material with a covering, for example, vinyl, and some have rigid backings, for example, made of wood boards. The National Fire Protection Association ("NFPA") has a Life Safety Code, NFPA 101. Section 6-5.4 is Interior Wall or Ceiling Finish Classification according to the test results of NFPA 255, Standard Method of Tests of Surface Burning Characteristics of Building Materials. The classes are as follows:

| Class | Flame Spread | Smoke Development |
|-------|--------------|-------------------|
| A     | 0 to 25      | 0 to 450          |
| B     | 26 to 75     | 0 to 450          |
| C     | 76 to 200    | 0 to 450          |

A flame retardant wall padding available on the market is available from Porter Athletic Equipment Company and includes a foam core mounted on a oriented strand wooden board and covered with a VONAR flame-retardant inner liner and finally a cover of flame retardant-vinyl coated polyester. The structure is illustrated in FIG. 1. Tests of this product have produced a flame spread index of 65 and a smoke development index of 845. Although the flame index meets the Class B standard, the smoke development does not. The Vonar material is a cellular polychloroprene laminate on the foam core to act as a flame barrier.

The present invention is a wall padding having a core of open cell, low smoke, flame resistant polychloroprene, a cover of fire retardant vinyl on the core. The total padding having a flame spread index in the range of 0 to 25 and a smoke development index in the range of 0 to 450. The core is mounted to a board and the cover covers the padding and the adjacent portions of the board. The board is oriented strand wood. The core has a density of 3 to 5 pounds per cubic feet and preferably 5 to 6 pounds per cubic foot. The core has a thickness in the range of 1 to 3 inches. The cover of the vinyl laminated with a polyester fabric.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
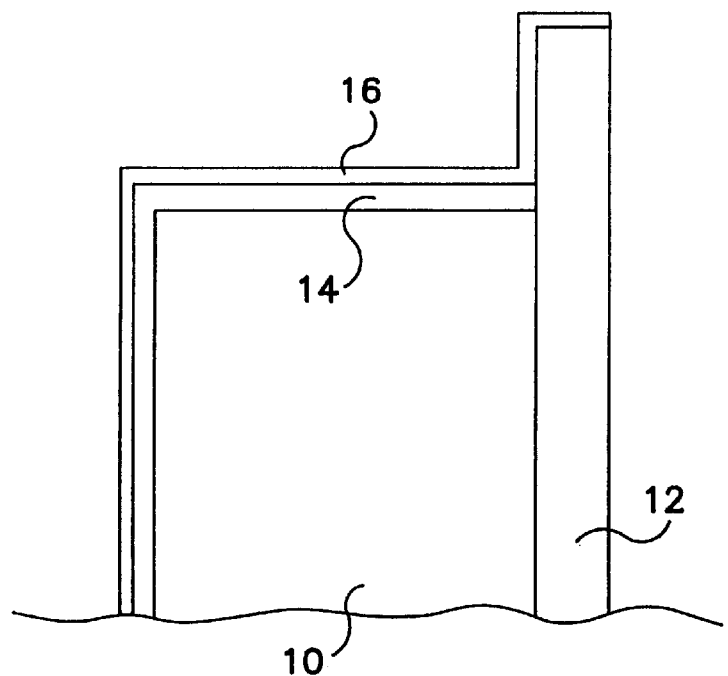
FIG. 1 is a cross sectional view of a wall padding according to the prior art.

FIG. 1 illustrates a prior art wall padding including a core 10 mounted to a board 12 and covered by a VONAR layer 14 which is subsequently covered by a cover layer 16. The core 10 can be urethane filler or bonded foam having a thickness in the range of 1½ to 2 inches. It is applied to by glue or other bonding agents to board 12 which is an oriented strand wooden board having a thickness, for example, of 7/16 of an inch. The Vonar inner liner 14 is a fire retardant material having a thickness in the range of ⅛ to ⅜ of an inch. The cover 16 is a vinyl laminated material using polyester filament yarn. The vinyl cover 16 is in the range of 14 to 32 ounces per square yard. The core with Vonar has a density in the range of 3.7 to 6 pounds per cubic foot. The VONAR is a cellular polychloroprene lamination.

Tests conducted under standard method of tests for surface burning characteristics and building materials NFPA 255 produce the results of the prior art wall padding of FIG. 1 of having a flame spread index of 65 and a smoke development index of 845. This would be in the range of Class B of Life Safety Code NFPA 101 for the flame spread index, but not for the smoke development index.

Figure 2:
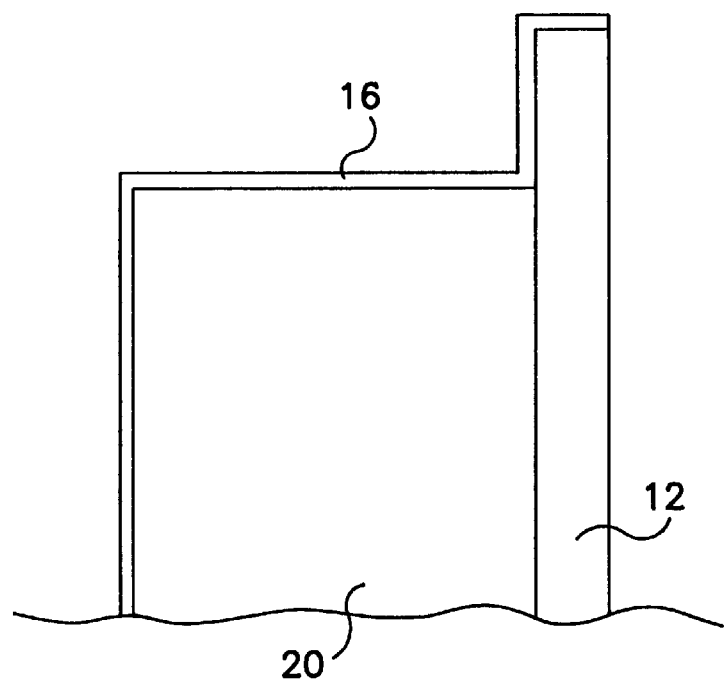
FIG. 2 is a cross sectional view of wall padding incorporating the principles of the present invention.

A padding which meets the classification A of the Life Safety Code NFPA 101 is illustrated in FIG. 2. The core 20 is mounted to the board 12 and covered by vinyl 16. The board 12 and the vinyl 16 are the same as that of FIG. 1 of the prior art. The core 20 is an open cell, low smoke, flame retardant polychloroprene. The core in combination with the board 12 and the vinyl coating 16 has a flame spread index in the range of 0 to 25 and a smoke development index of 0 to 450. This qualifies as Class A interior wall and ceiling finish materials under the Life Safety Code NFPA 101. Tests of padding of FIG. 2 had a flame spread index in the range of 25 and the smoke development index in the range of 430.

The polychloroprene material of core 20 has been used as the core for transit seating, full depth mattresses and other furniture.

The core material 20 may have a thickness in the range of 1 to 3 inches but preferably a thickness in the range of 2 inches. Similarly, the density can be in the range of 3 to 7 pounds per cubic foot, but is preferably in the range of 5 to 6 pounds per cubic foot.

It should be noted that test NFPA 255 is also known as a STME-84, UL-723, UBC 8-1 (42-1) and ANSI 2.5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A wall padding to be attached to a wall comprising:
    a board, a core of open cell, low smoke, flame resistant polychloroprene having a surface mounted directly onto the board;
    a cover of fire retardant vinyl covering a surface opposite to the surface mounted on the board and adjacent portions of the board; and
    the padding having a flame spread index in the range of 0 to 25 and a smoke development index in the range of 0 to 450.

2. A wall padding according to claim 1, wherein the board is oriented strand wood.

3. A wall padding according to claim 1, wherein the core has a density in the range of 3 to 7 pounds per cubic foot.

4. A wall padding according to claim 1, wherein the core has a density in the range of 5 to 6 pounds per cubic foot.

5. A wall padding according to claim 1, wherein the core has a thickness in the range of 1 to 3 inches.

6. A wall padding according to claim 1, wherein the cover is a vinyl laminated with a polyester fabric.

* * * * *